United States Patent

Street

Patent Number: 6,075,555
Date of Patent: Jun. 13, 2000

[54] METHOD AND APPARATUS FOR IMAGE ENHANCEMENT

[76] Inventor: Graham S. B. Street, Impstone House, Pamber Road, Silchester, Reading, Berks, United Kingdom, RG7 2NU

[21] Appl. No.: 08/942,365

[22] Filed: Oct. 2, 1997

Related U.S. Application Data

[63] Continuation-in-part of application No. PCT/GB96/00827, Apr. 3, 1996.

[30] Foreign Application Priority Data

Apr. 4, 1995 [GB] United Kingdom ............... 9506954

[51] Int. Cl.⁷ .................... H04N 13/02; H04N 13/04
[52] U.S. Cl. .................... 348/43; 348/49; 348/57
[58] Field of Search ............... 348/42, 43, 46, 348/49, 51, 57, 61

[56] References Cited

U.S. PATENT DOCUMENTS

| | | | |
|---|---|---|---|
| 4,239,937 | 12/1980 | Kampmann | 381/28 |
| 4,975,772 | 12/1990 | Fujita | 348/607 |
| 5,510,831 | 4/1996 | Mayhew | 348/47 |
| 5,767,898 | 6/1998 | Urano | 348/43 |

FOREIGN PATENT DOCUMENTS

90 00851  1/1990  WIPO .

*Primary Examiner*—Bryan Tung

[57] ABSTRACT

Apparatus and method for image enhancement in which an autostereoscopic image, comprising a different perspective view of an object field for each eye of an observer is, typically provided. The optical cross-talk, which is often a feature of autostereoscopic images, is suppressed when images are displayed, by preconditioning of the image intended for each eye. Supplementary image data is produced by mixing the different perspective image data and this is applied to the primary data. By inversion of a cross-talk matrix, two or more different perspective channels can be preconditioned to cancel the effects of such cross-talk, providing clear images for each eye without the unwanted interference from other views. The viewer's location with respect to the display device can be used to modify the characteristics of both the display and the level of cross-talk correction. A camera or endoscope for providing stereoscopic images can also suffer from optical cross-talk. The imagery captured by such a system may be improved by applying the same principles as are applied to the display process.

44 Claims, 4 Drawing Sheets

METHOD AND APPARATUS FOR IMAGE ENHANCEMENT

This application is a continuation-in-part of PCT International Application PCT/GB96/00827, filed Apr. 3, 1996, which designated the United States and the entire contents of which is incorporated herein by reference.

This invention is concerned with the field of three-dimensional imaging and particularly with the enhancement of the image quality perceived by an observer when a three-dimensional imaging system provides different perspective views of a scene to each of the observer's eyes.

BACKGROUND

In International Patent Application PCT/GB94/00405 (Street) apparatus is described in which two two-dimensional perspective images are combined with the aid of an optical system, so that each eye of the observer sees a different perspective but in the same location. This causes the brain to fuse these perspectives into one three-dimensional image.

In one of the preferred embodiments a lenticular screen in combination with a barrier strip array, an array of spaced opaque stripes on a transparent substrate, acts to direct light towards one eye of the observer. This projected light passes through an LCD screen on which a two-dimensional perspective is displayed. The arrangement is duplicated for the other eye, and both images are presented to the observer with the aid of a semitransparent mirror, so that they appear to be collocated.

A number of other embodiments are described, both in the aforementioned application and in other prior art, which allow an observer to view two different but collocated images so that a three-dimensional or stereoscopic image is perceived.

An important feature of all three-dimensional viewing systems is to provide a clear separation of the left and right eye images. It is often found, however, that there is a degree of optical cross-talk, so that a ghost of the image intended only for one eye is actually perceived by the other. In general terms, images intended to be seen from other points of view are actually seen in the form of ghost images mixed with the image actually intended to be seen at a given viewer location. This can be very disturbing and significantly reduces the clarity and image quality perceived by the observer.

A major source of optical cross-talk in multiple channel image projection systems can be due to the scattering of light at one or more surfaces intermediate the primary light source and the observer such as at the surface of a lenticular screen as used in the apparatus of PCT/GB94/00405 or in a lenticular print or transparency. Diffraction effects may also occur, for instance, at the plane of an LCD. Such devices often have very small elements, each comprising an independently operable aperture and, potentially, a source of diffracted light.

Another source of optical cross-talk can arise in the camera system which captures the plurality of images to be displayed. For instance, where this uses a field-sequential method coupled to electro-optic shuttering means to select different pupil positions in sequential fields, and thus different perspective views, or where a single optical channel carries two views with different polarisation vectors, optical mixing can occur due to inefficiencies in the optical or electro-optical elements.

A third example of optical cross-talk arises in a field-sequential display system, typically where this is operating at high data rates. Normally this is caused by the latency of the display system, for instance, the decay time of certain phosphors (typically the red component) in CRT systems. In U.S. Pat. No. 4,975,772 (Fujita) this particular problem is addressed (under the general heading of "After Image Reduction") by providing a frame memory for previously displayed image data and subtracting a proportion of its contents from the currently displayed image data.

SUMMARY OF THE INVENTION

It is an object of the current invention to suppress the perceived optical cross-talk arising in the use of stereoscopic or autostereoscopic displays which provide two or more perspectives of a scene or object field simultaneously, thereby improving the clarity of the observer's left and right eye images.

It is another object of the invention to cancel the effects of optical cross-talk in a camera system which is constructed to capture more than one perspective view of an object field.

It is a further object of the invention to allow the simultaneous relaying of two different and orthogonally polarised views of an object field through an optical system which does not totally preserve the initial polarisation of these two views.

It is yet a further object of the invention to allow the manipulation of image data for presentation with a lenticular screen so that the interference between different perspective views is minimised.

It is also an object of the invention to permit the suppression of cross-talk to be controlled as a function of viewer location Thus, according to the present invention there is provided apparatus for use in displaying stereoscopic images by substantially simultaneous display of a plurality of perspective views of an object field and/or scene comprising means for preconditioning first and second primary image data, said first and second primary data corresponding respectively to a first and a second two-dimensional perspective view of said object field and/or scene and, following preconditioning in use, to be displayed for viewing by respectively the first and the second eye of an observer, said preconditioning means being arranged to combine first supplementary image data with said first primary image data and second supplementary image data with said second primary image data.

According to one aspect of the invention the first supplementary image data is derived from at least the second primary image data and the second supplementary image data is derived from at least the first primary image data.

Preferably, preconditioning of the primary data comprises the addition or subtraction of the respective supplementary data and said primary and supplementary image data is proportional to the light levels corresponding thereto and observed, in use, within the image.

Advantageously the derived supplementary data is modified, in use, as a function of the observer's location with respect to means for the display of the image data.

Supplementary data can be a function of both the primary data from which it is derived and the location within the image corresponding to said primary data.

According to another aspect of the invention means for capturing image data corresponding to a plurality of perspective views of the object field comprises at least two real or virtual pupil locations, said pupils having spaced centres of gravity, so that, in use, light corresponding to different perspectives is passed at respective pupil locations to provide the first and the second primary image data.

Advantageously a transparent birefringent element is positioned intermediate the object field and a real pupil, whereby two virtual pupils, having spaced centres of gravity, are provided, so that, in use, a first virtual pupil passes light polarised in a first direction and corresponding to a first perspective view of the object field and the second virtual pupil passes light polarised in a second direction, orthogonal to said first direction and corresponding to a second perspective view of the object field.

Conveniently, coherent optical fibre means simultaneously relays two orthogonally polarised different perspective views of the object field to the image capture means and means for separating said polarised components prior to image capture, provides, in use, the first and second primary image data.

The two orthogonally polarised views may be circularly polarised, respectively clockwise and counter-clockwise.

The pupils may be sequentially operable, primary image data thereby being captured on a field sequential basis.

According to a further aspect of the invention preconditioning primary data comprises constructing the inverse of a matrix representing the optical cross-talk between each perspective channel and the other perspective channels, said matrix being square and having a number of elements equal to the square of the number of perspective channels, and applying said inverse matrix to said primary data.

The cross-talk may be caused by combining two or more color sequential images, in which each color component of each perspective view contributes a component of cross-talk to any other color component and all color components are perspective channels.

BRIEF DESCRIPTION OF THE DRAWINGS

The invention will now be described with reference to FIGS. 1 to 4 in which.

DETAILED DESCRIPTION OF PREFERRED EMBODIMENTS

Figure 1:
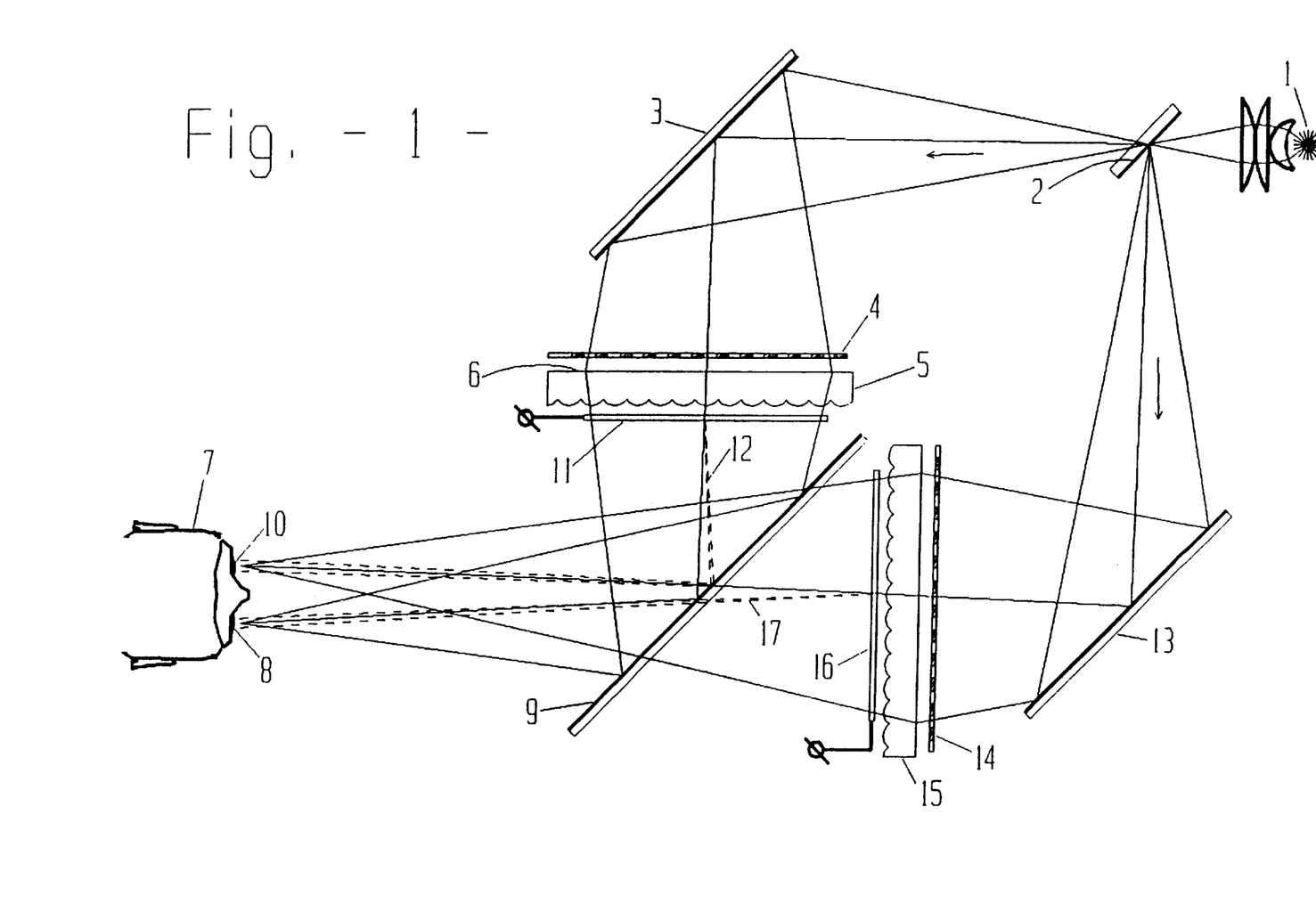
FIG. 1 shows how light is scattered from the projected path for one perspective image into the location for viewing the other perspective image.

In FIG. 1, light from a source 1 is split by a semitransparent mirror 2 into two components. Mirror 3 directs approximately 50% of the light to the rear of a barrier strip array or screen 4 This has a series of transmitting apertures spaced so as to substantially match the pitch of a lenticular screen 5. Screen 5 has a diffusing rear surface 6 on which the barrier screen's shadow produces a pattern of light. This pattern is scaled by adjusting the separation between the two screens until the observer 7 receives light from the entire area of screen 5 with his right eye 8 via a semitransparent mirror 9, whilst his left eye 10 is intended to see no light from screen 5. In practice, light is scattered both at the surface of lenticular screen 5 and by an LCD panel 11 placed in the light path. This scattered light, shown diagrammatically as the broken lines 12 arrives at the left eye, which is only intended to see light arriving via the other optical channel. This second channel consists of a mirror 13, barrier strip array 14, a corresponding lenticular screen 15 and a second LCD panel 16. In the same way that the left eye is only intended to see light from the second channel, some light is scattered at the surface of screen 15 and LCD 16, shown as the broken lines 17, to arrive at the observer's right eye location.

The scattered light, in effect, represents optical cross-talk. This can be represented mathematically as a 2×2 matrix. On the assumption, which will only be true in the symmetric case, that a fraction k of the light intended for the viewing zones for one eye is scattered into the zones for the other eye, leaving this the fraction (1−k), this matrix may be written as follows, $$(S_L, S_R) = C \cdot \begin{pmatrix} 1-k & k \\ k & 1-k \end{pmatrix} \cdot \begin{pmatrix} L_L \\ L_R \end{pmatrix}$$

in which $S_L$ and $S_R$ represent the optical signal received by the observer's left and right eyes respectively, C is a constant representing the fraction of all the available light entering each of the observer's pupils and $L_L$ and $L_R$ are the left and right eye components of the light signals intended for the observer's respective eyes. By inverting this matrix and generating two preconditioned light signals by applying this correction matrix to the original values of $L_L$ and $L_R$ two new signals may be produced. Using the same notation as above, these preconditioned signals, $P_L$ and $P_R$, are derived as follows, $$(P_L, P_R) = \frac{\begin{pmatrix} 1-k & -k \\ -k & 1-k \end{pmatrix}}{(1-2 \cdot k)} \cdot \begin{pmatrix} L_L \\ L_R \end{pmatrix}$$

When these preconditioned signals are applied to the two optical channels of FIG. 1, effective cancellation of the optical cross-talk resulting from the scattering fraction k is achieved. This holds true, as long as the demanded signal does not become negative, which condition is met for a wide variety of natural images. In practice, even when it does, it is usually quite acceptable to impose an overall neutral bias on the signal for both eyes, so that there is scope to subtract the required correction signal.

Figure 2:
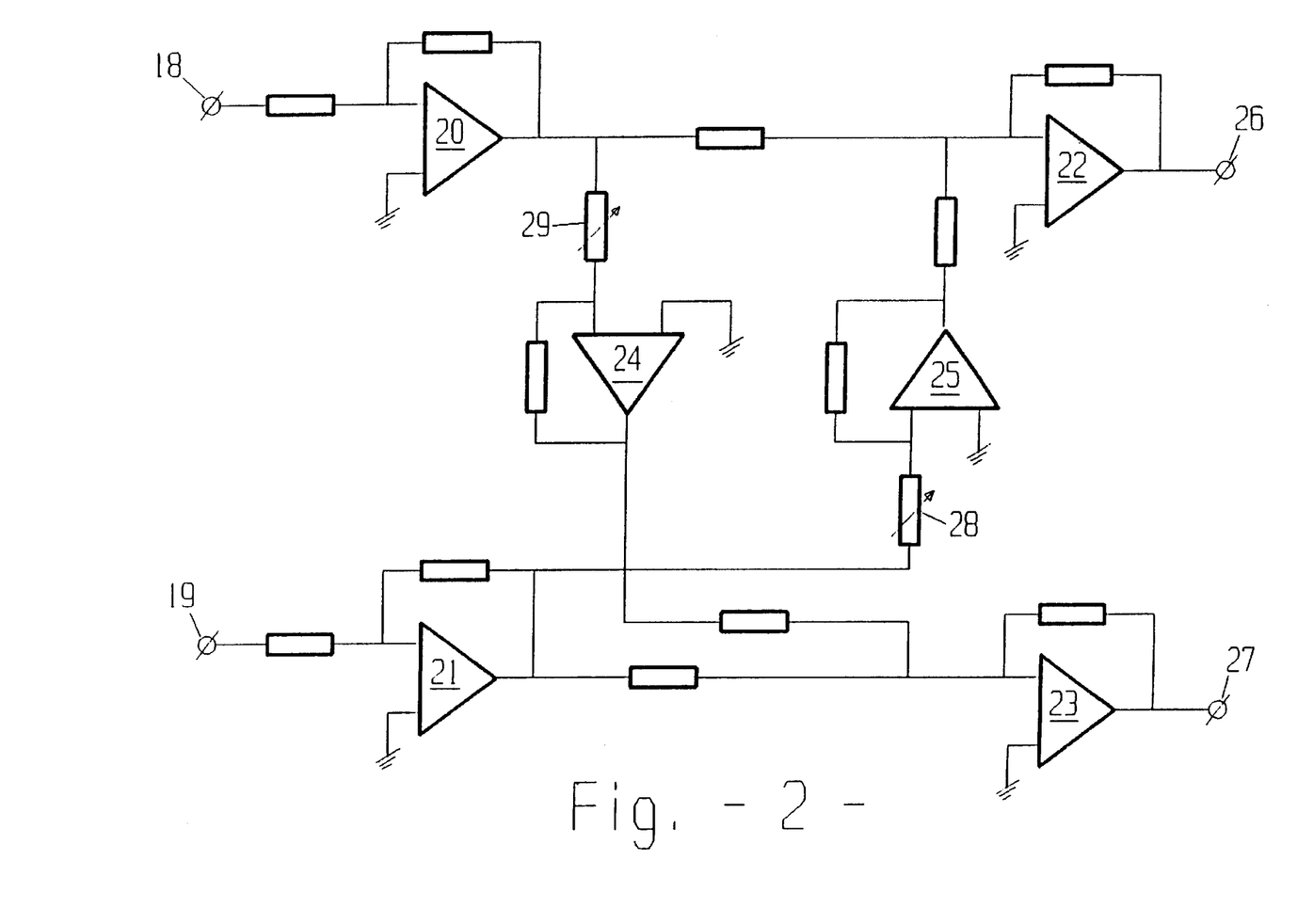
FIG. 2 is a block schematic of a circuit in accordance with the invention for cancelling the effect of the scattered light of FIG. 1.

In FIG. 2, a circuit is illustrated to generate the necessary signals for the left and right eye LCD panels of the embodiment of FIG. 1. Signals $L_L$ and $L_R$ are applied to inputs 18 and 19 respectively. Two inverting amplifiers 20 and 21 produce signals for two summing amplifiers 22 and 23 which also invert, thus producing the correct polarity of signal. The appropriate small proportion of the inverted output of the left eye input amplifier 20 is inverted by amplifier 24 and fed to the summing node of the right eye output amplifier 23 as supplementary data. Conversely, amplifier 25 feeds a small inverted component of the output of the right eye input amplifier 21 to the summing node of the left eye output amplifier 22. The outputs 26 and 27 of amplifiers 22 and 23 are fed to the inputs of LCD panels 16 and 11 respectively. By adjusting variable resistors 28 and 29 the correct preconditioning may be applied to the left and right eye channels respectively. It will be apparent, to those skilled in the art, that, for the particular embodiment of FIG. 1, any video signal fed to one of the LCD panels must be organised to scan the image in a horizontal direction opposite to that of the corresponding video signal fed to the other LCD panel. This is necessary in order to correct for the action of semitransparent mirror 9. In the embodiment as shown in FIG. 2, this is assumed to be achieved by inverting the LCD itself. Alternatively, the same result may be achieved by using line buffers and reading out the primary and/or preconditioning image data in the appropriate direction before passing this to the LCD panels.

In systems where the degree of scattering is not constant, for example, where this depends on the viewer's location or the position within the image area, it will be apparent to those skilled in the art, that the gains of amplifiers 24 and 25 may be controlled dynamically, providing the relevant data is available This will be so for systems of the kind described in application PCT/GB94/00405, where a head tracking system locates the observer. The embodiment of FIG. 1 treats each video signal as comprising a single channel for each eye. It is often advantageous to process colour signals as three independent primary channels for the red, green and blue components of the image (known as RGB). Each colour would then be processed by a circuit of the form of FIG. 2 and could, where scattering is colour dependent, have different degrees of preconditioning prior to being displayed. An important condition for the successful application of the circuit of FIG. 2, is that the transfer function of the system be linear. That is to say, a percentage change in the signal applied to input 18 of the circuit should result in the same percentage change in the light transmitted by LCD panel 16 of FIG. 1. As LCD's typically have a non-linear transfer function, the output stages 22 and 23 of the circuit must compensate for this by being suitably non-linear. Furthermore, the actual function corresponding to the LCD's non-linearity is found, for many LCD's, to be strongly dependent on the vertical viewing angle. The transfer function of the system between the summing amplifiers of FIG. 2 and the LCD panels of FIG. 1 is conveniently controlled as a function of head position data when this is available, as is typically the case for an autostereoscopic display as described in application PCTIGB94/00405. An important additional benefit of such control is that correct colour balance is maintained over a substantial dynamic range of the LCD and for a substantial range of viewing angles.

Whilst the embodiment of FIG. 1 shows the use of two separate LCD's, this invention is equally applicable to a system in which one screen is used to produce two or more views for autostereoscopic viewing. In systems of this kind a lenticular screen is typically used in front of the display surface to isolate the right and left eye views. Because such a screen's surface causes some light to be scattered, there will be optical cross-talk. Other autostereoscopic projection systems, using retro-reflective or direction-selective screens, will display similar characteristics. By preconditioning each view to be displayed in accordance with this invention, the effect of such cross-talk can be substantially reduced.

In the example given, a 2×2 matrix is inverted to cancel errors introduced by a two channel system. It will be clear, to those versed in the art, that this invention may be applied to multiple-channel autostereoscopic systems, both for static and dynamic images. Although the example of the circuit of FIG. 2 shows how the deliberate mixing of two optical channels can, in effect, reduce the perceived cross-talk between them, the principle of this invention may be extended to systems which utilise a greater number of perspective views. The cross-talk from each independent view into the viewing channel of any other can be defined as a matrix, in accordance with the principles set out in the foregoing. This matrix may then be inverted, and thus a suitable preconditioning network established in order to reduce the visible effect of the unwanted cross-talk.

For example, a lenticular screen may have a large number of perspective views represented at the focal plane of its lens elements. Some optical cross talk may result due to scatter at the lenticular lens surface or other limitations in the optical performance of the system. This cross-talk may be represented as a N×N matrix (typically symmetric), in which the diagonal terms are close to unity, the off-axis terms are small and N is the number of views represented for the purpose of cross-talk suppression. The inverse matrix may be derived and applied to the original image data for each respective view, in accordance with the invention thus mitigating the effects of the unwanted cross talk. For this particular example, it is more practical to apply a convolution process to derive the preconditioning required for cross-talk suppression. Every point is affected by its close neighbours in a similar way and the matrix is effectively very large, with the terms off the diagonal become vanishingly small, at some distance therefrom. Similar arguments apply for a multiple view projection system, in which a retro-reflective or direction selective screen is used to separate the viewing locations for different views at the observer's location.

Figure 3:
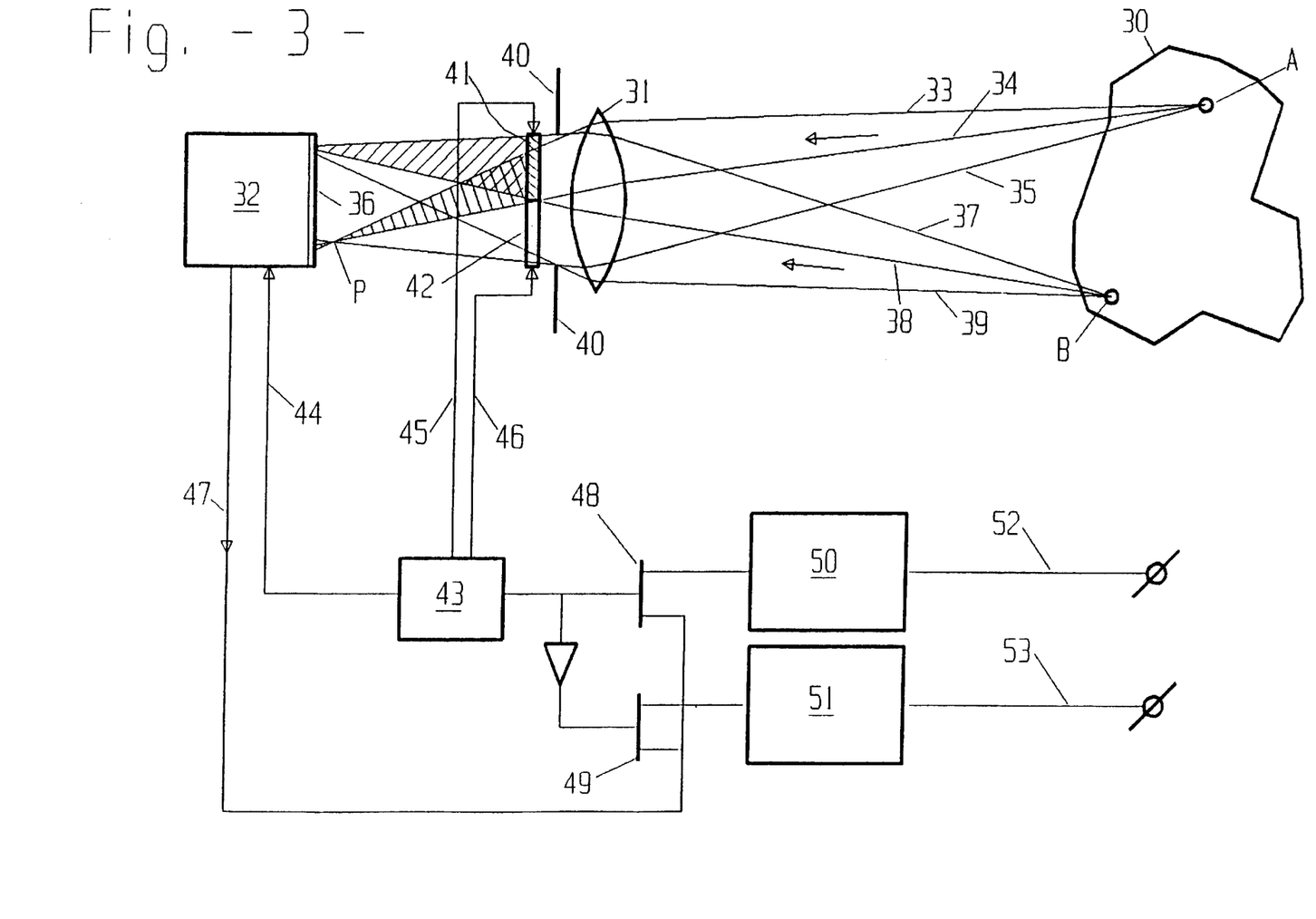
FIG. 3 illustrates the use of a single camera with multiple electro-optic pupil locations in accordance with the invention.

The principles of this invention may be applied to the image capture process. This is illustrated with the aid of FIG. 3. An object field 30, shown schematically has points A and B which are imaged by a lens 31 to form an image on a CCD array 32. The rays 33 to 35 originating at point A converge to a point P in front of the CCD's surface 36, whereas rays 37 to 39 from point B, closer to the lens 31, converge to a point behind surface 36. Lens 31 has a stop, shown as line 40 having a gap. Immediately behind stop 40 there is an electrically operated segmented shutter having a left 41 and right 42 portion. Each portion may be rendered transmitting or substantially opaque by a control circuit 43. When the left portion is opaque, the hatched regions between rays 33 and 34 and that between rays 37 and 38 are intended to be void of light. This corresponds to blocking a "left eye" perspective view of the object field. Conversely, portion 42 of the shutter may be rendered opaque and portion 41 transmitting when the "right eye" perspective view is blocked. Line 44 from circuit 43 controls the frame rate of the CCD 32 and lines 45 and 46 the timing of the shutter portions 41 and 42 respectively so that these are synchronised to alternate fields of the CCD. As each eye's perspective image data is read out of CCD 32 on line 47 this is directed by circuit 43 through one of two analogue switches 48 and 49 and stored in buffers 50 and 51. Each of these buffers is double ported and provides outputs on lines 52 and 53 during each field. In this way stereoscopic image data is provided using a single lens system. In practice, the operation of shutter segments 41 and 42 may not be 100% efficient. This can be particularly the case where the operation has been optimised for the green band, when some blue and red light will continue to be passed even when a particular segment is deemed to be opaque. This inefficiency may be regarded as optical cross-talk at the input of a stereoscopic video system. By feeding the two signals from lines 52 and 53, which may in fact represent groups of three physical lines where RGB data is being processed, into a circuit similar in form to that of FIG. 2, outputs corresponding to the actual image data required may readily be generated.

A simple (two segment) split pupil system has been used to illustrate how the invention may be employed to unscramble different perspective views obtained through a single optical channel. Other camera arrangements are possible, some involving the use of endoscopes and the like. Here there may be multiple pupils utilising a single optical channel, or polarisation may be used to characterise two independent image components. The optical mixing that occurs in such systems can conveniently be overcome by applying the principles of this invention.

Figure 4:
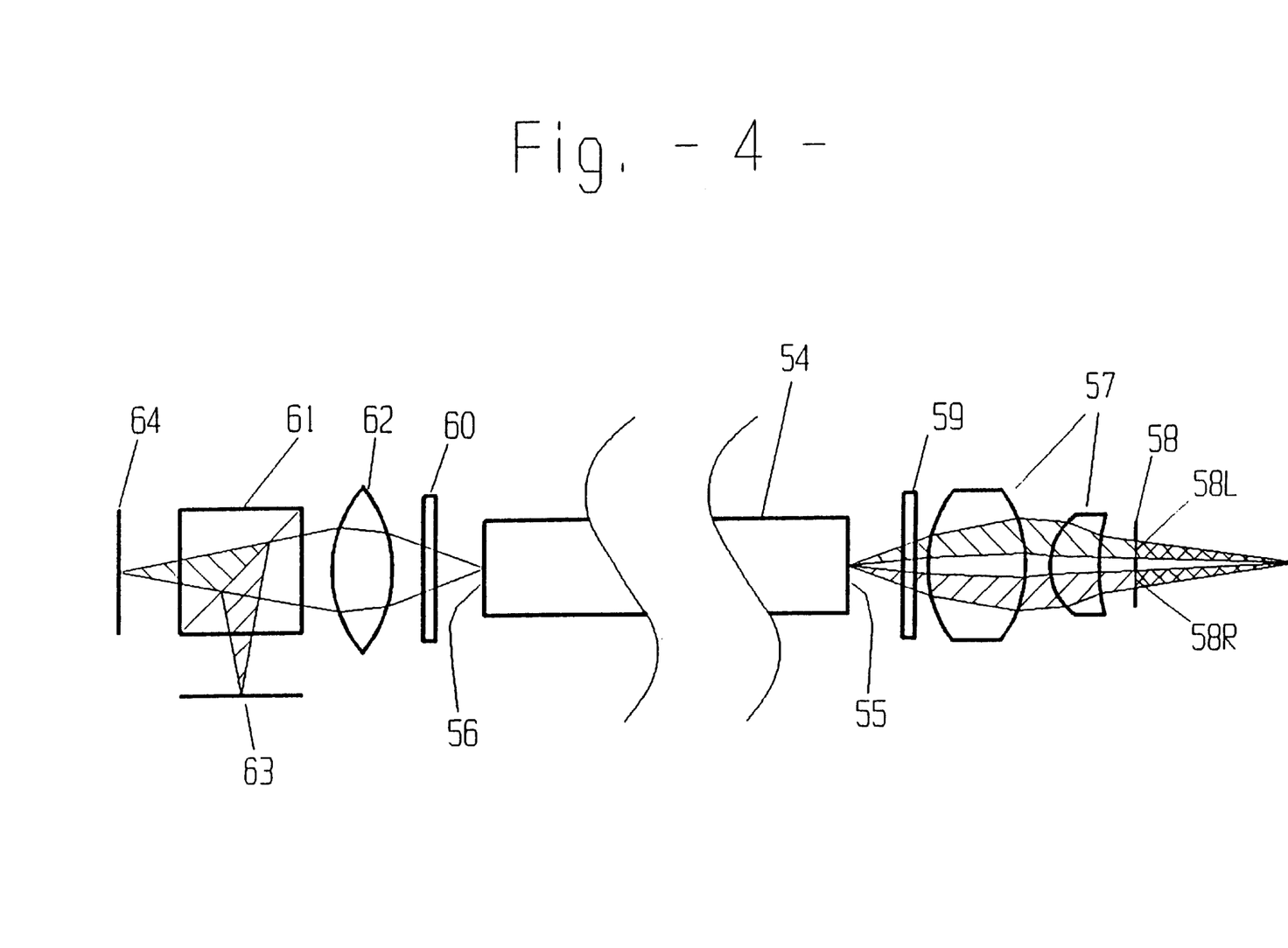
FIG. 4 is a diagrammatic view of a stereoscopic endoscope for use in accordance with the invention

In FIG. 4, an example of an endoscopic system, to which the principles of the current invention may conveniently be applied, is illustrated. A coherent fibre-optic bundle 54, transfers an image from one end face 55 to the other 56. At the distal end of the endoscope, there is an objective lens assembly 57, which forms a first image of the object field on face 55. In front of the objective 57 there is a composite pupil 58. This composite pupil has two segments 58L and 58R. Because each has a centre of gravity spaced from that of the other and behaves as a pupil in its own right, the segments correspond to slightly different points of view, this arrangement being, in principle, equivalent to that of FIG. 3. Segment 58L transmits light for a left eye view, whilst segment 58R transmits light for a right eye view. Each segment comprises a polarising element. The element of 58L has its direction of polarisation orthogonal to that of the element of 58R. Although the principles of this invention may be applied in the case where the light remains plane polarised, it is often found to be convenient to insert a quarter-wave plate 59 in the light path between the polarisers and the coherent fibre 54, so that the linearly polarised left and right eye components become circularly polarised. The image formed on the exit face 56 of the fibre bundle comprises two essentially circularly polarised components, although some depolarisation takes place inside the fibre. When the two image components are separated using a second quarter-wave plate 60 and a polarising beam splitter 61, some mixing or optical cross-talk will be observed. Lens 62 forms both images on two CCD's 63 and 64. The principles of this invention may be applied to provide a left and right eye image without this unwanted effect. Since both images are formed simultaneously, no storage of the signals is required and these may be transmitted directly to the viewing system.

In the embodiment of FIG. 4, a physical pupil 58 has been segmented into two laterally displaced polarising portions 58L and 58R. An alternative which achieves a similar result is the insertion of a birefringent slab of material, such as calcite, in the path between the physical pupil 58 and the object field. Cut at a suitable angle to its principal axes, this introduces a relative shift between the centre of gravity of two virtual images of the actual pupil and, in effect, each of these passes light polarised orthogonally to that passed by the other, but originating from a slightly different point of view of the object field.

It will be understood that the term stereoscopic includes the term autostereoscopic for the purpose of this invention.

Whilst the suppression of cross-talk has been described in the context of two different perspectives of the same object field, it will be apparent that the two images can comprise completely different subject matter, or views of the same subject matter at different instants in time. The scope of the term "different perspective view" should therefor be taken to include any different two-dimensional image.

The provision of a stereoscopic image may be accomplished in a number of different ways. The conventional Field Sequential Display, in which each eye receives image information during alternate fields, as described in U.S. Pat. No. 4,975,772, often suffers from the unwanted disadvantage of flicker causing the viewer eye fatigue and discomfort. U.S. Pat. No. 4,641,178 (Street) which is incorporated by reference herein, overcomes this problem by simultaneously displaying a spectral component of the left eye image (such as green) and a complementary spectral component of the right eye image (such as red and blue). When such images (referred to below as Color Sequential) are transmitted in the conventional way, cross-talk between these components can arise, due to the inefficiencies of the encoding system (such as NTSC, PAL and SECAM) and also due to those of the color selecting electro-optic glasses required to view a stereo image, presented in this way.

It is within the scope of this invention to compensate for the cross-talk which arises when two Color Sequential perspective views are combined, in accordance with the teachings of U.S. Pat. No. 4,641,178, into one composite video signal. In addition to some mixing between the different color components within a single perspective, due to imperfect coding and subsequent decoding, there will be similar effects between the color components of the two different perspectives. Imperfect operation of the color selective electro-optically switched elements, used in the spectacles for viewing or in front of the monitors for displaying such images, will lead to similar effects. For a system comprising two perspective views, the sum total of such effects may be expressed as a 6×6 cross-talk matrix. As previously described, this matrix may be inverted to provide the terms for a compensation network to suppress these unwanted effects. In effect there are six perspective channels in such an arrangement, in which each perspective view comprises three such channels, one for each color component.

I claim:

1. Apparatus for use in displaying stereoscopic images by substantially simultaneous display of a plurality of perspective views comprising:

display means having a non-linear voltage-light transfer characteristic;

means for preconditioning first and second primary image data, said first and second primary image data corresponding respectively to a first and a second two-dimensional perspective view to be displayed, after preconditioning by said preconditioning means, for viewing by respectively the first and the second eye of an observer, said preconditioning means being arranged to combine first supplementary image data with said primary image data and second supplementary image data with said second primary image data, wherein the first supplementary image data is derived from at least the second primary image data and the second supplementary image data is derived from at least the first primary image data, wherein said display means includes means with a non-linear characteristic for driving said display means, so that, in use, the light transmitted to the observer from a point on said display means is linearly related to the signal input to said driving means corresponding to said point.

2. Apparatus as claimed in claim 1, further comprising means for modifying the non-linear characteristic of said driving means as a function of the observer's location with respect to said display means.

3. Apparatus as claimed in claim 2 in which the preconditioning of image data is modified, in use, as a function of the observer's head position.

4. Apparatus as claimed in claim 3 in which the derived supplementary data is a function of both the primary data from which it is derived and the location within the image corresponding to said primary data.

5. Apparatus as claimed in claim 4 in which the preconditioning means comprises means for imposing an overall neutral bias on the signals for both eyes.

6. Apparatus as claimed in claim 5, further comprising means for capturing image data corresponding to perspective views of an object field from at least two real or virtual pupil locations, said pupils having spaced centers of gravity, so that, in use, light corresponding to different perspectives is passed at respective pupil locations to provide the first and the second primary image data.

7. Apparatus as claimed in claim 1 in which the preconditioning of image data is modified, in use, as a function of the observer's head position data.

8. Apparatus as claimed in claim 1 in which the derived supplementary data is a function of both the primary data from which it is derived and the location within the image corresponding to said primary data.

9. Apparatus as claimed in claim 1 in which the preconditioning means comprises means for imposing an overall neutral bias on the signals for both eyes.

10. Apparatus as claimed in claim 1, further comprising means for capturing image data corresponding to perspective views of an object field from at least two real or virtual pupil locations, said pupils having spaced centers of gravity, so that, in use, light corresponding to different perspectives is passed at respective pupil locations to provide the first and the second primary image data.

11. Apparatus as claimed in claim 10, further comprising a transparent birefringent element intermediate the object field and a real pupil, whereby the two virtual pupils having spaced centers of gravity are provided, so that, in use, a first virtual pupil passes light polarized in a first direction and corresponding to a first perspective view of the object field, and the second virtual pupil passes light polarized in a second direction and corresponding to a second perspective view of the object field.

12. Apparatus as claimed in claim 11, further comprising coherent optical fibre means to simultaneously relay the two polarized different perspective views of the object field to the image capture means, and means for separating said polarized components prior to image capture, to provide, in use, the first and second primary image data.

13. Apparatus as claimed in claim 12, in which the two polarized views are circularly polarized, respectively clockwise and counter-clockwise.

14. Apparatus as claimed in claim 11, wherein the first polarization direction is orthogonal to the second polarization direction.

15. Apparatus as claimed in claim 1, wherein said display means includes a liquid crystal display.

16. Apparatus for capturing at least first and second perspective views of an object field, comprising:
 image capture means;
 optical means for transmission of the views to said image capture means, in which said optical means causes light from the at least first and second views to suffer some optical cross-talk to form at least a first and a second composite image on said capture means; and
 processing means,
 wherein said optical means includes at least two real or virtual pupil locations, said pupils having spaced centers of gravity; said image capture means provides a linear response to light impinging thereon; and said processing means, in use, combines in a linear manner the video data comprising the first composite image with the video data comprising the second composite image to provide first and second primary image data corresponding substantially to the first and the second perspective views of the object field.

17. Apparatus as claimed in claim 16, further comprising a transparent birefringent element intermediate the object field and a real pupil, whereby the two virtual pupils having spaced centers of gravity are provided, so that, in use, a first virtual pupil passes light polarized in a first direction and corresponding to a first perspective view of the object field, and the second virtual pupil passes light polarized in a second direction and corresponding to a second perspective view of the object field.

18. Apparatus as claimed in claim 17, wherein the first polarization direction is orthogonal to the second polarization direction.

19. Apparatus as claimed in claim 18, further comprising coherent optical fibre means to simultaneously relay the two orthogonally polarized different perspective views of the object field to the image capture means, and means for separating said polarized components prior to image capture, to provide, in use, the first and second primary image data.

20. Apparatus as claimed in claim 19, in which the two orthogonally polarized views are circularly polarized, respectively clockwise and counter-clockwise.

21. Apparatus as claimed in claim 16, further comprising coherent optical fibre means to simultaneously relay two orthogonally polarized different perspective views of the object field to the image capture means, and means for separating said polarized components prior to image capture, to provide, in use, the first and second primary image data.

22. A method for use in displaying stereoscopic images by substantially simultaneous display of a plurality of perspective views comprising:
 preconditioning first and second primary image data, said first and second primary data corresponding respectively to a first and a second two-dimensional perspective view, by deriving first supplementary image data from at least the second primary image data and second supplementary image data from at least the first primary image data;
 combining said first supplementary image data with said first primary image data, and said second supplementary image data with said second primary image data; and
 displaying on at least one liquid crystal display said first preconditioned image data to a first eye of an observer and said second preconditioned image data to the second eye of said observer, said displaying including driving the liquid crystal display with a non-linear characteristic so that, in use, the light transmitted to the observer is linearly related to the signal input to said driving step after said combining step.

23. A method as claimed in claim 22 in which preconditioning primary data comprises constructing the inverse of a matrix representing the optical cross talk between each perspective channel and the other perspective channels, said matrix being square and having a number of elements equal to the square of the number of perspective channels; and applying said inverse matrix to said primary data.

24. A method as claimed in claim 23 in which preconditioning primary data includes sampling a complete image comprised of image data, determining the minimum value of the preconditioned data and applying a uniform bias to said preconditioned data to ensure that this does not represent a demand for negative values to be displayed by the display means.

25. A method as claimed in claim 22 in which preconditioning primary data includes sampling a complete image comprised of image data, determining the minimum value of the preconditioned data and applying a uniform bias to said preconditioned data to ensure that this does not represent a demand for negative values to be displayed by the display means.

26. A method for capturing at least first and second perspective views of an object field which includes the steps of:

providing at least two real or virtual pupils with spaced centers of gravity;

providing at least one CCD having a linear response to light impinging thereon;

transmitting said perspective views to the CCD via the pupils, thereby causing light from the at least first and second views to suffer some cross-talk resulting in the formation of at least first and second composite images on the CCD; and combining in a linear manner at least the captured image data corresponding to the first composite image with captured image data corresponding to the second composite image thereby providing first and second primary image data corresponding substantially to the first and the second perspective views of the object field.

27. A method for preconditioning image data to be displayed, the image data including first and second primary image signals corresponding to respective views to be displayed simultaneously, said method comprising:

deriving first supplementary image data from at least the second primary image signal, and deriving second supplementary image data from at least the first primary image signal, the first and second primary image signals used in the deriving steps corresponding to respective views to be displayed simultaneously;

combining the first primary image signal with said first supplementary image data, thereby producing a first preconditioned signal;

combining the second primary image signal with said second supplementary image data, thereby producing a second preconditioned signal; and forwarding said first and second preconditioned signals for display.

28. A method as claimed in claim 27, wherein each of the first and second primary image signals is a color signal.

29. A method as claimed in claim 28, wherein the first and second primary image signals have no color in common.

30. A method as claimed in claim 28, wherein the first primary image signal includes at least one of Red, Green, and Blue; and the second primary image signal includes at least one of the Red, Green, and Blue excluded from the first primary image signal.

31. A method as claimed in claim 30, wherein, during a first time interval, the first primary image signal includes Red and Blue and the second primary image signal includes Green; and further wherein, during a second time interval, the first primary image signal includes Green and the second primary image signal includes Red and Blue.

32. A method as claimed in claim 31, wherein the second time interval is immediately subsequent to the first time interval such that the first and second time intervals are alternating fields.

33. A method as claimed in claim 32, further comprising the step of displaying said first preconditioned image signal to one eye of an observer, and displaying said second preconditioned image signal to the observer's other eye.

34. A method as claimed in claim 27, wherein the first and second primary image signals are real-time image signals.

35. A method as claimed in claim 27, further comprising the step of displaying said first preconditioned image signal to one eye of an observer, and displaying said second preconditioned image signal to the observer's other eye.

36. Apparatus for preconditioning image data to be displayed, the image data including first and second primary image signals corresponding to respective views to be displayed simultaneously, said apparatus comprising:

a deriving circuit for deriving first supplementary image data from at least the second primary image signal, and for deriving second supplementary image data from at least the first primary image signal, the first and second primary image signals corresponding to respective views to be displayed simultaneously;

a combining circuit for combining the first primary image signal with said first supplementary image data, thereby producing a first preconditioned signal; and for combining the second primary image signal with said second supplementary image data, thereby producing a second preconditioned signal; and an output for outputting said first and second preconditioned signals.

37. Apparatus as claimed in claim 36, wherein each of the first and second primary image signals is a color signal.

38. Apparatus as claimed in claim 37, wherein the first and second primary image signals have no color in common.

39. Apparatus as claimed in claim 37, wherein the first primary image signal includes at least one of Red, Green, and Blue; and the second primary image signal includes at least one of the Red, Green, and Blue excluded from the first primary image signal.

40. Apparatus as claimed in claim 39, wherein, during a first time interval, the first primary image signal received by said deriving circuit includes Red and Blue and the second primary image signal includes Green; and further wherein, during a second time interval, the first primary image signal received by said deriving circuit includes Green and the second primary image signal includes Red and Blue.

41. Apparatus as claimed in claim 40, wherein the second time interval is immediately subsequent to the first time interval.

42. Apparatus as claimed in claim 41, further comprising a display for displaying said first preconditioned image signal to one eye of an observer, and for displaying said second preconditioned image signal to the observer's other eye.

43. Apparatus as claimed in claim 36, wherein the first and second primary image signals are real-time image signals.

44. Apparatus as claimed in claim 36, further comprising a display for displaying said first preconditioned image signal to one eye of an observer, and for displaying said second preconditioned image signal to the observer's other eye.

* * * * *